(12) United States Patent
Houben et al.

(10) Patent No.: US 6,530,579 B1
(45) Date of Patent: Mar. 11, 2003

(54) WEDGING BLADE CLAMP FOR SCROLL SAW

(76) Inventors: Jan P. Houben, Kabienstraat 5A, 2382 Poppel (BE); James P. Orrico, 6137 N. Harlem Ave., Chicago, IL (US) 60631; Michael Holzer, Jr., 408 Country Lane Ct., Wauconda, IL (US) 60084

( * ) Notice: Subject to any disclaimer, the term of this patent is extended or adjusted under 35 U.S.C. 154(b) by 19 days.

(21) Appl. No.: 09/614,461

(22) Filed: Jul. 11, 2000

(51) Int. Cl.$^7$ ............... B23B 31/107; B23B 31/22
(52) U.S. Cl. ............... 279/30; 30/392; 83/699.21; 279/75; 279/905
(58) Field of Search ............... 279/22, 30, 905, 279/157, 75; 403/369; 83/699.21; 30/392–394

(56) References Cited

U.S. PATENT DOCUMENTS

| | | | | |
|---|---|---|---|---|
| 1,089,755 A | * | 3/1914 | Fischer ............... | 279/22 |
| 2,838,266 A | * | 6/1958 | Rees ............... | 279/22 |
| 4,299,402 A | | 11/1981 | Hoffman | |
| 4,601,477 A | * | 7/1986 | Barrett et al. ............... | 279/30 |
| 4,648,182 A | | 3/1987 | Hoffman | |
| 5,322,302 A | | 6/1994 | Quirijnen | |
| 5,409,243 A | * | 4/1995 | Shadeck et al. ............... | 279/157 |
| 5,443,276 A | | 8/1995 | Nasser et al. | |
| 5,573,255 A | | 11/1996 | Salpaka | |
| 5,575,071 A | | 11/1996 | Phillips et al. | |

* cited by examiner

Primary Examiner—Steven C. Bishop (57) ABSTRACT

A wedging clamp assembly is provided for retaining a saw blade. A housing defining a vertical cavity therein is included in the assembly. The cavity includes a top end and a bottom end tapered with respect to the top end. Extending through a bottom end of the housing is a saw blade passageway included in the bottom end of the cavity. Disposed inside the cavity is a saw blade retention mechanism. A piston is further disposed within the cavity. The saw blade retention mechanism is configured for lockingly retaining a saw blade upon insertion into the passageway, thus, causing the piston to be biased against the bottom end of the cavity. At least one locking element is further included in the saw blade retention mechanism, and such locking element is disposed in the cavity for engaging the bottom tapered end. A wedging clamping force exerted by the at least one locking element is applied to the saw blade, and such force renders the saw blade immobile relative to the housing. The saw blade retention mechanism is configured to release the blade when the biasing force on the piston is overcome by an opposing force applied to the piston, thus, releasing the wedging clamping force.

31 Claims, 6 Drawing Sheets

WEDGING BLADE CLAMP FOR SCROLL SAW

FIELD OF THE INVENTION

The present invention relates generally to a quick release chuck device configured for operation with a scroll saw blade, and specifically to a wedging blade clamp assembly having a release mechanism.

BACKGROUND OF THE INVENTION

Conventional power saws are known to have blade holders using spring-loaded wedge members which urge captured balls against corresponding recesses or openings in blade shanks. Such prior art saw blade holders typically require the separate retraction of the clamping mechanism to permit insertion and removal of the saw blade. Other known blade retention assemblies further require the operator to grasp an outer surface of the retention mechanism and alternately push and/or pull the outer surface to insert and remove the blade. In addition, still other known blade clamping systems require the operator to twist and rotate the blade clamp into locked and open positions. These known arrangements are time consuming and cumbersome.

More specifically, U.S. Pat. No. 4,299,402 issued to Hoffman discloses a blade holder for a saber saw. The blade provided is configured with a pair of opposed side marginal edges with a notch or recess in at least one side marginal edge near the rear side of the blade. Hoffman further discloses a saber saw blade holder having a pair of biased balls that engage the corresponding notches or recesses in the blade. The balls are urged against the blade by a retractable, spring-loaded barrel with an internal wedge-shaped cavity.

A disadvantage in Hoffman is that to remove the saw blade, the barrel must be manually grasped and rotated in a clockwise or rightward direction to pull the biased balls away from their engagement with the recesses or notches in the rear end of the saw blade. A reverse rotating motion in a counter-clockwise or leftward direction is required to re-engage the biasing balls with the notches or recesses of the blade.

A further disadvantage in Hoffman is that the saw blade must be specifically manufactured with specially shaped notches or recesses to engage the balls of the spring-loaded barrel. A third disadvantage is that Hoffman does not disclose or suggest a one-handed insertion mechanism for the saw blade.

U.S. Pat. No. 5,573,255 issued to Salpaka discloses a quick release chuck device for holding a saw blade. The saw blade has a rectangular shank portion and a detente recess defined in at least one of its side edges. The Salpaka device includes a body member having an internal longitudinal bore. A transverse radial bore is in communication with the longitudinal bore through a short side of the longitudinal bore. An engaging device, such as a detente ball, is positioned in the radial bore and is radially movable within the radial bore so that at least a portion of it extends into the longitudinal bore to contact an edge of the saw blade in a locking position of the chuck device.

A spring-biased outer sleeve is further disposed about a portion of the body member. This outer sleeve is movable longitudinally with respect to the body member between a locked position and a released position.

A disadvantage in Salpaka is that a separate action is required of an operator to grasp the outer sleeve and pull or push the outer sleeve longitudinally against the biasing force of the spring mechanism to insert or release the saw blade. Another disadvantage is that Salpaka does not disclose or suggest a one-handed saw blade insertion mechanism of the present blade holding assembly.

U.S. Pat. No. 5,575,071 issued to Phillips et al., discloses a clamping system for attaching a saw blade to a blade carrier of a reciprocating saw. The system includes a clamp member having a hollow interior and a tubular body. The clamp member is disposed on a free end of a blade carrier which includes a longitudinal slot for receiving a shank of a saw blade. In a side wall of the blade carrier there is an aperture. A ball is received within this aperture and moves freely therein. The clamp member has an inner surface which includes an eccentric groove. A camming surface which engages the ball is defined by the eccentric groove. A spring is attached to the blade carrier and the clamp member to bias the clamp member toward a first or locked position.

A disadvantage in Phillips is that the clamp member must be separately rotated to a first locking position whereby the ball engages an opening in the shank of a saw blade to hold the blade in place. A further disadvantage is that the clamp member must be rotated to a second unlocking position to disengage the ball from the aperture in the blade to allow for blade removal.

Another disadvantage, as in the case with Hoffinan, is that Phillips requires saw blades manufactured with an aperture to engage the ball.

In using blade retaining mechanisms in a scroll saw, operators desire a convenient one-handed insertion of the blade into the holder without the separate retraction of the holder or the use of a separate tool. Operators further desire a faster and easier quick change mechanism for a scroll saw blade. Improvement in blade changing is also needed by those with little hand strength or other hand problems such as carpal tunnel syndrome.

Thus, there is a need for a blade retention mechanism whereby a blade may be easily inserted with one hand into the holder, merely by thrusting a part of the retention mechanism upward with sufficient force to overcome a downward force of a biased spring. Once inserted, the blade will not come out unless released, due to a wedging clamping action of at least one locking element against the blade.

Therefore, it is an object of the present invention to provide an improved blade retention mechanism allowing the one-handed insertion of the blade into the holder without the separate retraction of the holder.

A further object of the present invention is to provide an improved blade retention mechanism featuring faster and easier blade changing for a scroll saw blade even for operators with decreased hand strength.

SUMMARY OF THE INVENTION

The above identified objects are met or exceeded by the present wedging blade clamp for a scroll saw. An improved quick release chuck device is provided that allows the one-handed insertion of a blade into a holder without separate retraction of the blade holder. A blade may be inserted into the holder merely by thrusting the blade into the holder with sufficient force to overcome a biasing force exerted by a biasing element. Once inserted, the blade will not come out unless released, due to a wedging clamping action of at least one locking element against the blade. A release member acts on the retention mechanism to release the biasing force and allow removal of the blade. In another embodiment of the present invention, the retention mechanism is directly acted upon to release the biasing force and allow removal of the blade.

More specifically, the present invention provides a wedging clamp assembly for retaining a saw blade. A housing is included having a vertical cavity. The vertical cavity has a top end and a bottom end tapered with respect to the top end. The bottom end of the vertical cavity has a saw blade passageway that extends through a bottom end of the housing.

Furthermore, a saw blade retention mechanism is disposed within the vertical cavity and includes a piston disposed within the cavity. The saw blade retention mechanism is configured for lockingly retaining the saw blade upon insertion into the passageway, causing the piston to be biased against the bottom end of the vertical cavity.

The saw blade retention mechanism further includes at least one locking element that is disposed in the vertical cavity for engaging the cavity's bottom tapered end and for exerting a wedging clamping force on the saw blade. The wedging clamping force renders the saw blade immobile relative to the housing.

The saw blade retention mechanism is configured for releasing the blade when the biasing force on the piston is overcome by an opposing force applied to the piston, thus, causing the wedging clamping force on the saw blade to be released. This action allows for the one-handed insertion of the blade into the clamping assembly without the separate retraction of the holder. Thus, a quick change of a scroll saw blade is provided, even for operators with decreased hand strength.

DETAILED DESCRIPTION OF A PREFERRED EMBODIMENT

Figure 1:
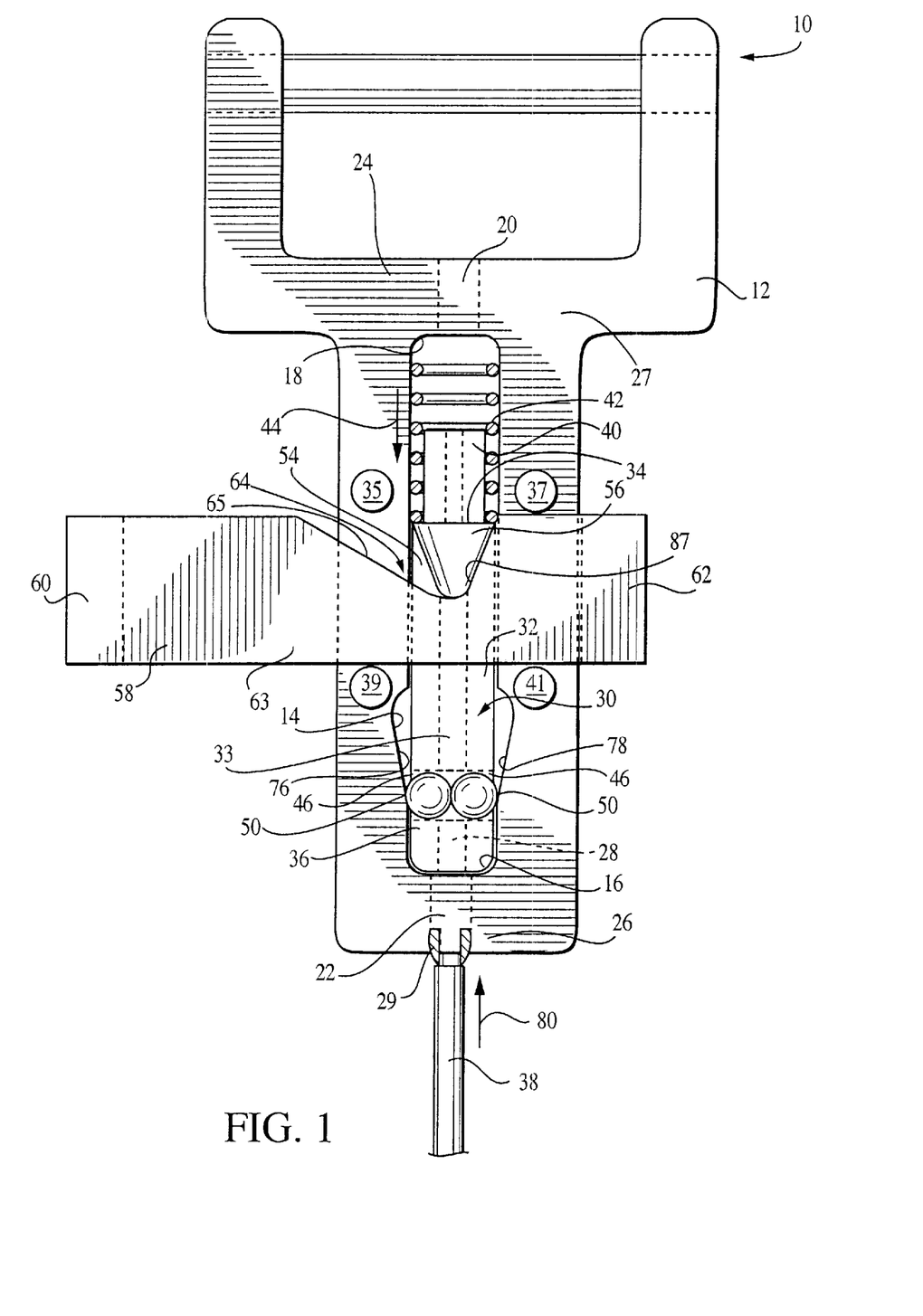
FIG. 1 is a front view of a first embodiment of an improved quick release chuck device of the present invention depicting a saw blade just prior to insertion.

Referring particularly to FIG. 1, the present wedging blade clamp assembly, generally designated 1 0, includes a housing 12. The assembly 10, as illustrated, is preferably of the type installed in a scroll saw, however, installation in other types of known power tools is contemplated. Also, the assembly 10, as illustrated, is depicted as disposed on a scroll saw, for retaining the upper end of the blade. However, the clamp assembly 10 may also or alternatively be positioned to retain a bottom end of the blade, or on other known power tools. Moreover, the clamp assembly 10, as illustrated, is disposed vertically, however, gravity plays a minor role in the present invention, and as such, the assembly may be disposed at other angular orientations, including horizontally.

The housing 12 defines a generally vertical cavity 14 therein. A bottom end 16 of the cavity 14 is constructed and arranged to be wedge-shaped and to become narrowed and tapered inward. Both a top end 18 of the cavity 14 and the bottom end 16 of the cavity 14 define at least one and preferably two longitudinal bores, a bore 20 in communication with a top end 24 of the housing 12, and a bore 22 in communication with a bottom end 26 of the housing 12, respectively. A face of the housing is designated 27. The longitudinally extending bores 20 and 22 define a saw blade passageway 28. The present invention is not susceptible to dust, but is subject to malfunction or corrosion caused by liquids. Thus, in a preferred embodiment, a saw blade wiper 29, as seen most clearly in FIG. 2, is disposed at an entrance to, and has a central opening in communication with, the bottom bore 22.

Referring now to FIG. 1, disposed within the cavity 14 is a saw blade retention mechanism, generally designated 30. A vertically reciprocating piston 32 is one of the major components of the saw blade retention mechanism 30, and is constructed and arranged to have a vertical groove 33 extending its full length. Preferably, the vertical groove 33 is in communication with the saw blade passageway 28. The piston 32 further includes a top end 34 and a bottom end 36.

Figure 2:
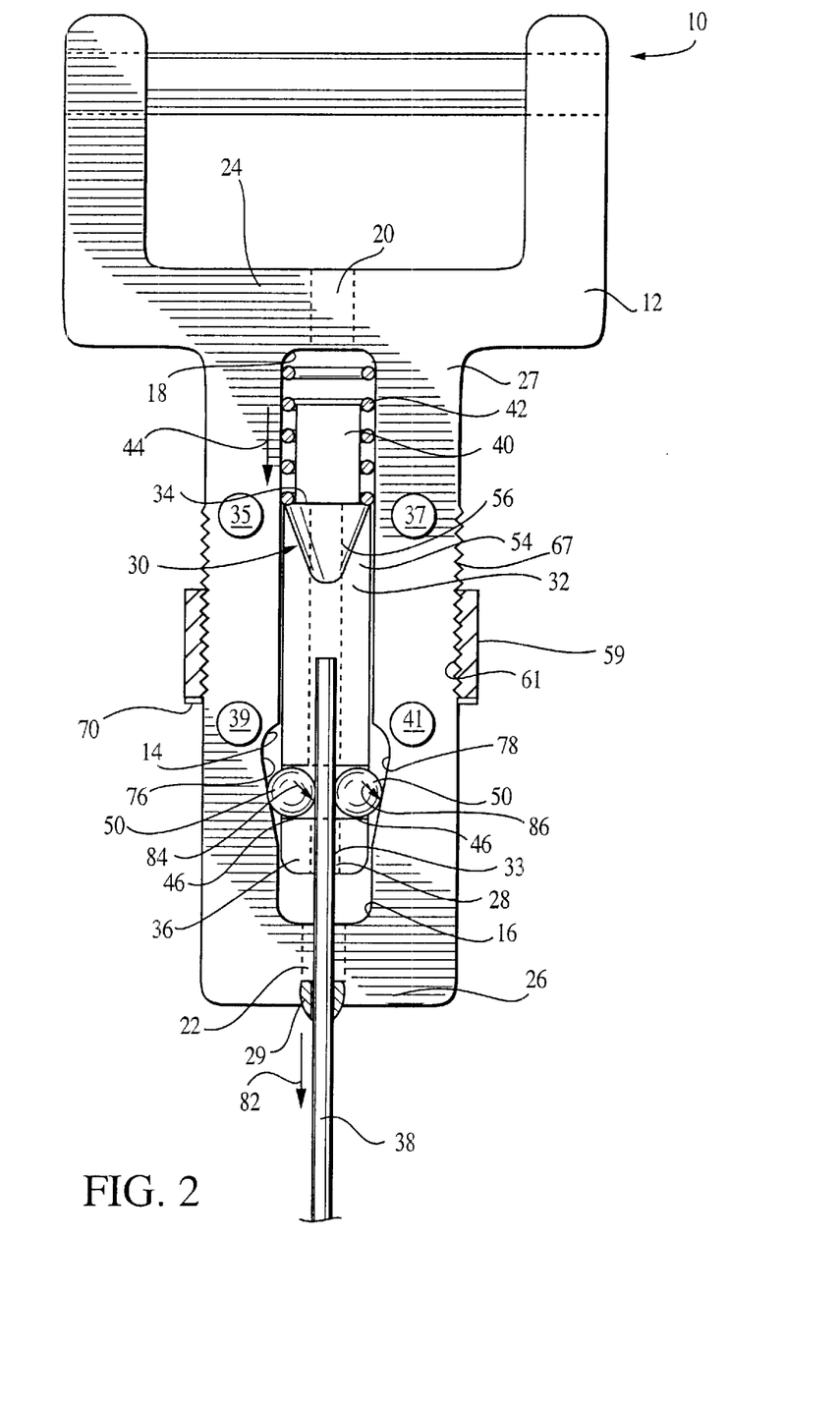
FIG. 2 is a front view of a first embodiment of the improved quick release chuck device of the present invention depicting the saw blade in a locked position.

In general, as more clearly seen in FIG. 2, the saw blade retention mechanism 30 retains a saw blade 38 in a locked position once the saw blade has been inserted into the saw blade passageway 28. Merely upon such insertion, and without the separate release of any locking mechanism, the blade is held by the retention mechanism 30.

In a first embodiment of the present invention as seen in FIG. 1, a cylindrical boss 40 is disposed at the top end 34 of the piston 32. Disposed about the cylindrical boss 40 is biasing element 42, preferably a spring. In the preferred embodiment 10a, as more clearly seen in FIG. 5, the cylindrical boss 40 is eliminated and the biasing element 42 is engaged about the top end 34 of the piston 32. The biasing element 42, as clearly seen in FIGS. 1 and 5, exerts a downward biasing force 44 on the piston 32 to bias the piston 32 against the bottom end 16 of the cavity 14 to retain the saw blade 38 in a locked position.

Referring to FIG. 1, the bottom end 36 of the piston 32 is constructed and arranged to have at least one preferably horizontal slot 46. In a preferred embodiment, the bottom end 36 of the piston 32 has two slots 46. Disposed within the slots 46 of the present blade retention mechanism 30, is at least one locking element 50, preferably a generally cylindrical pin or a ball. It is also contemplated that the at least one locking element could be configured as a wedge-shaped, spring-loaded block. There is at least one locking element 50 per every slot 46. Most preferably, the present invention has two slots 46, in the bottom end 36, with a corresponding locking element 50 disposed in each slot. The locking elements 50 are positioned in the bottom tapered end 16 of cavity 14, and are radially or horizontally movable within their corresponding slots 46. The piston 32, the locking elements 50, and the biasing element 42 inclusively, are parts of the saw blade retention mechanism 30 and are all constructed and arranged to be disposed within the cavity 14.

Referring now to FIG. 1, the piston 32 is provided with at least one face, generally designated 54. A portion of the face 54 adjacent the top end 34 of the piston 32 is constructed and arranged to have a formation 56 protruding therefrom.

Figure 3:
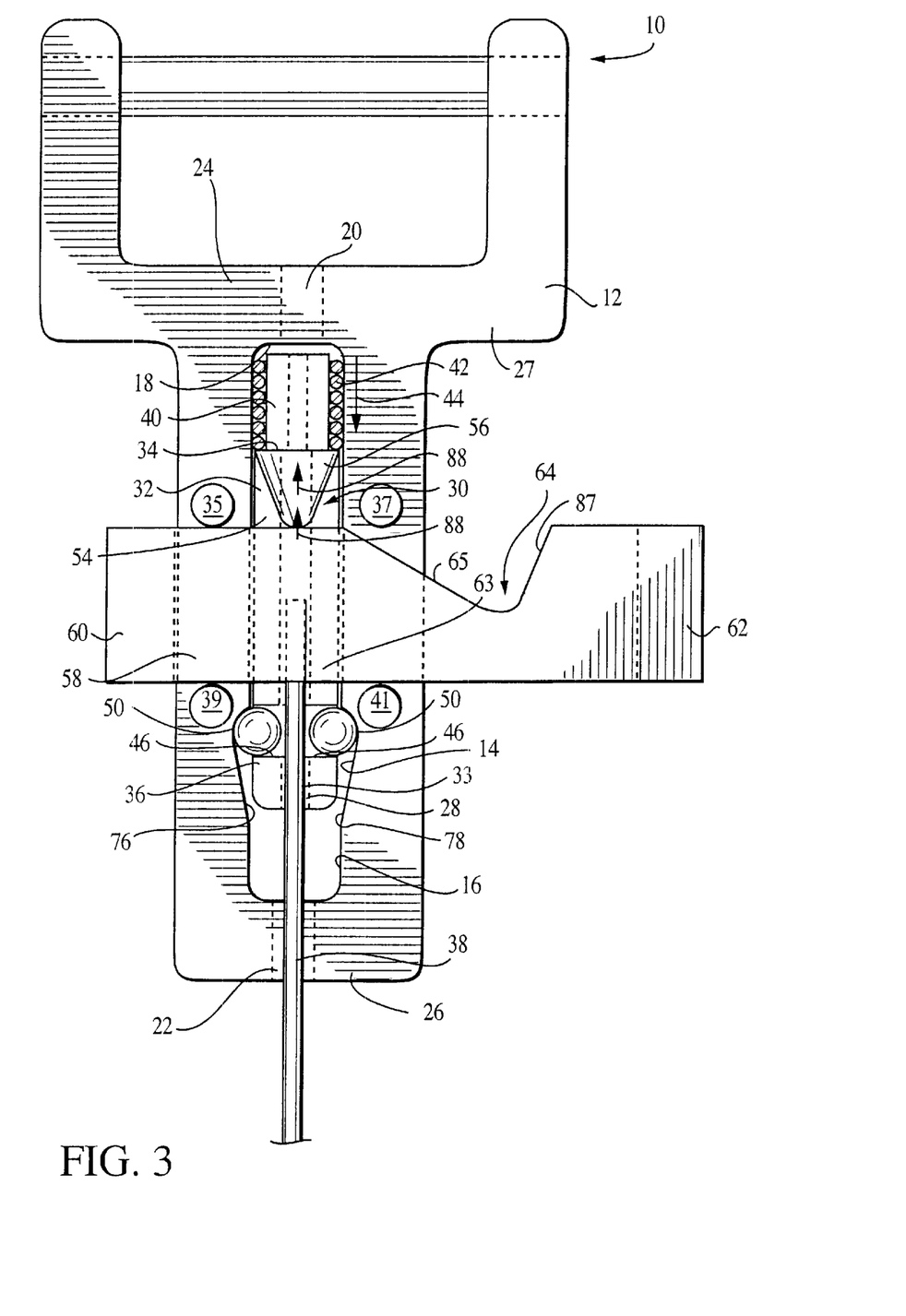
FIG. 3 is a front view of a first embodiment of the improved quick release chuck device of the present invention specifically illustrating a retention mechanism releasing the saw blade.

In one embodiment of the present invention as seen in FIG. 1, a release member, preferably a switch, 58, is slidingly engaged relative to the formation 56 on the at least one face 54 of the piston 32. The switch 58 has a first end 60, a second end 62 and a mid portion 63. The switch 58 is constructed and arranged to be thrust transversely to engage the formation 56 on the at least one face 54 of the piston 32. This upward, ramping engagement is produced by a 'V' notch 64 having an angled leg 65 which engages the formation 56. It will be appreciated that the slope and the length of the leg 65 may vary to suite the desired amount of vertical travel of the piston 32. As seen in FIGS. 1 and 3, threaded fasteners 35, 37, 39 and 41, disposed in the face 27 of the housing 12, create a track for the switch 58 to slidingly engage the formation 56. Heads of the fasteners 35, 37, 39 and 41 retain the switch 58 against the housing 12. The switch 58 and the biasing element 42 operate to hold the saw blade retention mechanism 30 in the cavity 14, which is closed at an end opposite the face 27. In one embodiment, as seen in FIGS. 1 and 3, the switch 58 will be thrust transversely from left to right with its first end 60 leading the engagement with the formation 56.

In another embodiment of the present invention, the switch 58, as more clearly seen in FIG. 2, is alternatively a ring member 59 having a preferably threaded inner surface 61. The inner surface 61 is preferably constructed and arranged to be axially moved by rotation along threads 67 on the housing 12 which engage the inner surface 61. Upward rotation of the ring member 59 engages the formation 56. The ring member 59 is prevented from falling downward on the housing 12 by at least one spring clip 70.

Figure 6:
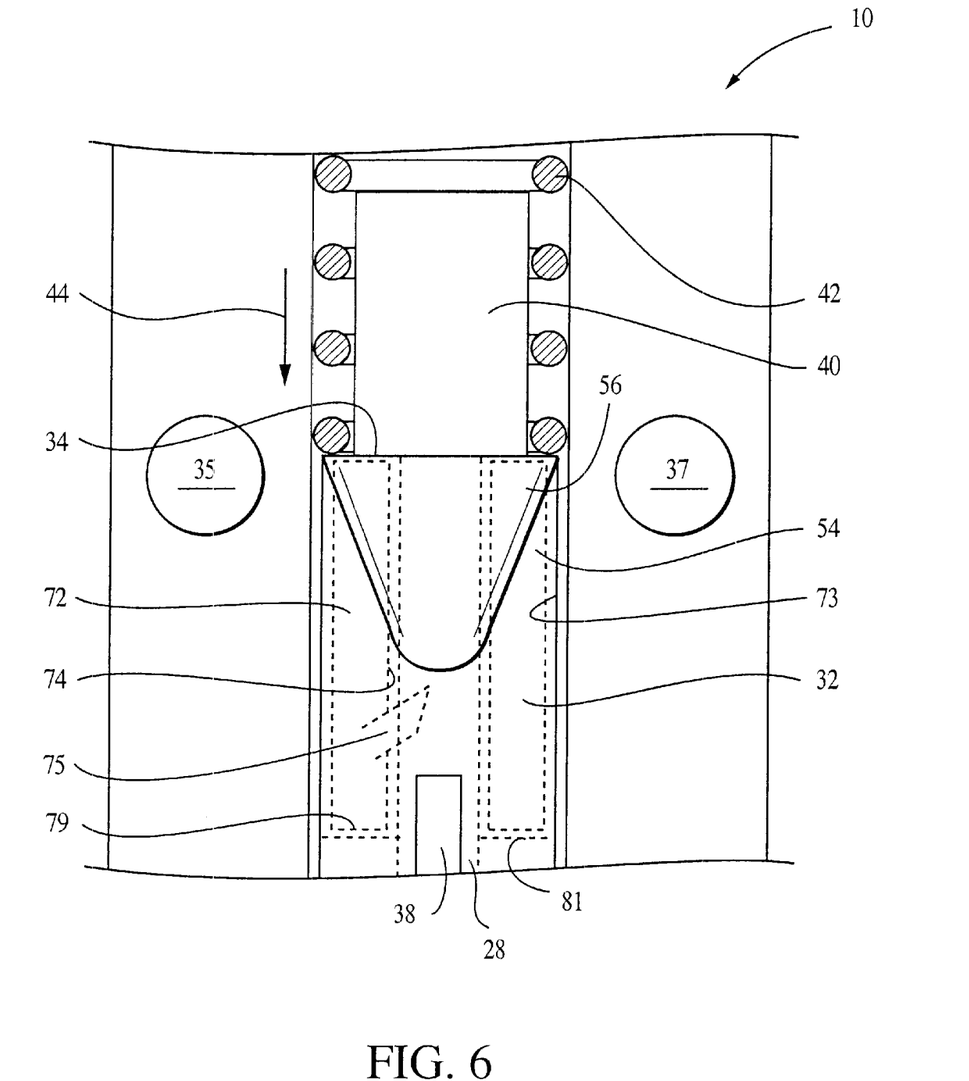
FIG. 6 is a fragmentary front view of an alternative embodiment of the improved quick release chuck device of the present invention.

Furthermore, in still another embodiment of the present invention, as seen in FIG. 6, an insert member 72 is disposed in a counterbore 73 of the piston 32, and is constructed and arranged for providing an insert passageway 74 that is in communication with the saw blade passageway 28. The insert member 72 further includes at least one, preferably biased, insertion-indicating stop member 75 secured in the insert member to be pivotable with respect to the insert passageway 74. It is preferred that the insertion indicating stop member 75 be constructed and arranged to provide a tactile indication of the proper insertion depth of the blade 38 in the passageway 28. In the preferred embodiment, the stop member 75 is integrally molded with the insert member 72 and has an inherent biasing or spring-like quality. Other conventional configurations of spring-loaded indicators are contemplated. Depending on the length of the blade 38, the insertion indicating stop member 75 will prevent the user from inserting the blade too far into the insert passageway 74, at the expense of not having enough blade to be retained at the opposite end. Upon the blade end contacting the stop member 75, the user will know that the blade has been sufficiently inserted.

In addition, the insertion indicating stop member 75 can be forced out of the insert passageway 74 in the event a broken blade fragment becomes lodged therein. The blade fragment is pushed against the stop member 75 with sufficient force to overcome the inherent biasing quality and permit the passage of the blade fragment through the insert passageway 74. The insert member 72 is further constructed and arranged to be engaged at its lower end 79 by at least one shoulder 81 disposed in the piston 32. The shoulder 81 is preferably perpendicular relative to the saw blade passageway 28.

Figure 4:
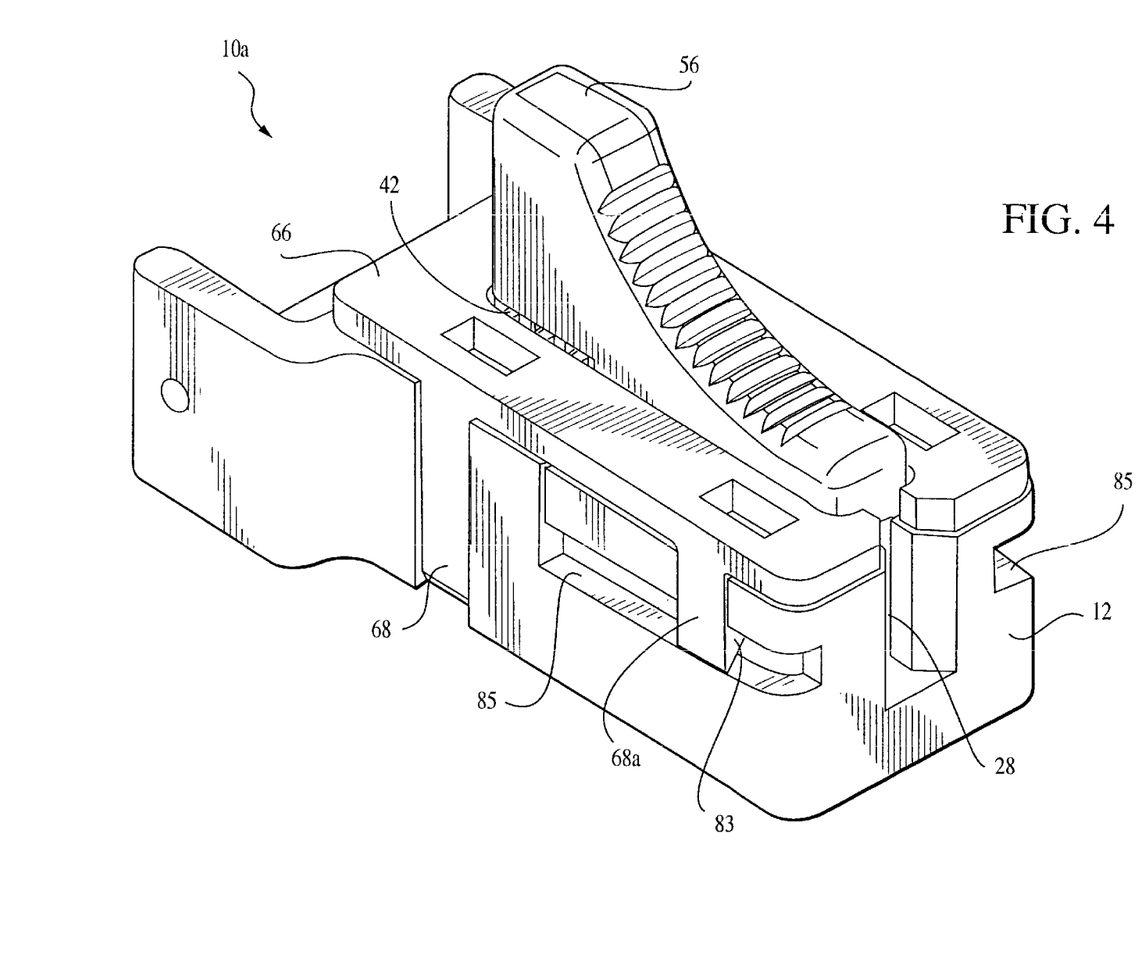
FIG. 4 is a perspective view of a second embodiment of the improved quick release chuck device of the present invention.
Figure 5:
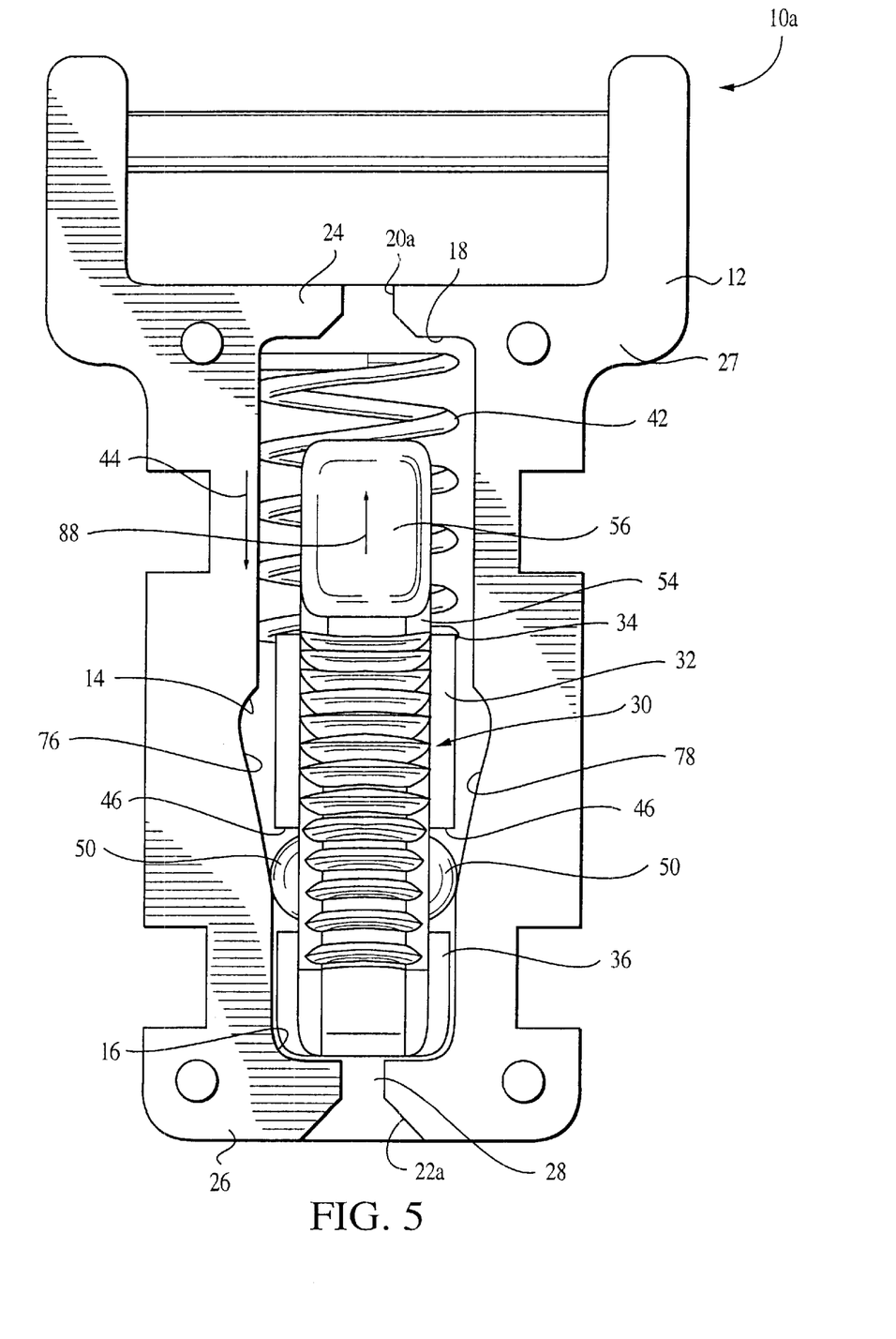
FIG. 5 is a front view of a second embodiment of a retention mechanism of the present invention.

Referring now to FIGS. 4 and 5, the preferred embodiment of the present blade clamp assembly is generally designated 10a. Components shared with the clamp assembly 10 are designated with identical reference numbers. In the blade clamp assembly 10a, the switch 58, or alternatively the ring member 59, is eliminated and the formation 56 is larger than in the blade clamp assembly 10. It is contemplated that the saw upon which the present clamp assembly 10 or 10a is employed is provided with a blade preloader or an adjustable blade tensioner (not shown) as is known in the art, to take the operational pre-load off the blade 38 before it is inserted or released. Also, in the embodiment 10a, the bores 20 and 22 are configured to be smaller flared ends 20a and 22a, that act like a funnel to center the blade 38.

Furthermore, in the blade clamp assembly 10a, a cover plate 66 is attached to the housing 12 and is provided to cover and contain the saw blade retention mechanism 30 in the housing. The cover plate 66 includes at least one and preferably four normally extending leg portions 68 which engage corresponding grooves in the housing 12 to enable the cover plate 66 to be snap fit over, or otherwise fastened to the saw blade retention mechanism 30.

Moreover, in another embodiment of the present invention, referring to FIG. 4, the cover plate 66 and the formation 56 are integrally fabricated. As a result, the extending leg portions 68a are constructed and arranged to be shorter in length and further include at least one tab member 83. The housing 12 is further modified to define a track 85 therein. The at least one tab member 83 is slidingly engaged in the track 85, and this engagement provides for the unified movement of the cover plate 66 and the formation 56 when the saw blade 38 is inserted or released from the present wedging blade clamp assembly 10a.

In operation, in both embodiments 10 and 10a, it will first be seen that the biasing element 42 applies the downward biasing force 44 to the piston 32. As such, the piston 32 is caused to be biased against the bottom end 16 of the cavity 14. As a result, the locking elements 50, positioned inside the slots 46 at the bottom end 36 of the piston 32, are squeezed inward toward each other as they roll downwardly along a first narrowing inner wall 76 and a second narrowing inner wall 78, seen best in FIG. 1, of the cavity 14.

In one embodiment of the present invention as seen in FIG. 1, each of the narrowing inner walls 76 and 78 has an angle of inclination. It is contemplated that the first narrowing inner wall 76 is constructed and arranged to have an equal angle of inclination as the second narrowing inner wall 78. In another contemplated embodiment of the present invention, as seen in FIG. 1, the angle of inclination of the first narrowing inner wall 76 varies from an angle of inclination of the second narrowing inner wall 78. More specifically, one of the narrowing inner walls is generally vertical, while the other narrowing inner wall is angled relative to the other generally vertical wall. This embodiment provides optimum support to the saw blade 38 upon insertion and further provides for a reduced friction release of the saw blade.

When the saw blade 38 is inserted into the saw blade passageway 28, the saw blade 38 comes into contact with the locking elements 50. As the blade 38 is inserted further into the passageway 28 and with greater force, the blade 38 causes the piston 32 to rise upwardly in the cavity 14. At this time, the locking elements 50 also climb up the inner walls 76 and 78 of the cavity 14 toward a preferably wider upper end. As the blade is inserted further, the locking elements 50 maintain contact with the blade 38, as seen in FIG. 2, but are caused to spread outwardly apart so that the saw blade 38 may pass between them.

It is understood that the saw blade 38 can move all the way through the saw blade passageway 28 as long as a pushing insertion force 80, shown in FIG. 1, exerted upon the blade is greater than the downward biasing force 44 exerted on the piston 32 by the biasing element 42. In a preferred embodiment of the present invention, as seen in FIG. 6, engagement of the insertion indicating stop member 75 by the blade 38 alerts the operator to refrain from further insertion of the blade 38.

Referring now to FIG. 2, once the saw blade 38 is pushed past the locking elements 50, the saw blade 38 cannot be retracted. A pulling force 82 applied to the saw blade 38 only further locks the blade 38 into place. When the saw blade 38 is pulled away from the piston 32, the biasing element 42 pushes the piston, and the locking elements 50 are caused to roll downwardly in a direction along with the saw blade 38 into the tapered bottom end 16 of the cavity 14. When the locking elements 50 reach a certain point in the tapered bottom end 16 where they become wedged in the tapered end while in contact with the saw blade 38, they apply a wedging clamping force 84 to the saw blade 38. At this point, the saw blade 38 is retained in the housing 12 by the wedging clamping force 84 of the locking elements 50. The wedging clamping force 84 is the product of a frictional force 86 both between the saw blade 38 and the locking elements 50, and friction between the locking elements 50 and the narrowing inner walls 76 and 78 of the cavity 14.

It is understood that once the locking elements 50 roll downward far enough in the cavity 14, to the point where there is no additional clearance between the locking elements 50, the narrowing inner walls 76 and 78, and the saw blade 38, that the saw blade 38 becomes wedged by the wedging clamping force 84 and is rendered immobile with respect to the housing 12. The greater the pulling force 82 exerted on the saw blade 38, the larger the wedging clamping force 84 exerted on the saw blade 38 by the locking elements 50.

Referring now to FIGS. 1 and 3, the release of the saw blade 38 from the saw blade retention mechanism 30 will now be described. A user takes the operational pre-load off the blade 38 before it is released by using the contemplated blade preloader or the adjustable blade tensioner (not shown) as is known in the art. In the assembly 10, the switch 58 is then transversely pushed so that the formation 56 is engaged by and vertically displaced by the leg 65 of the notch 64. Preferably, the switch 58 is pushed from left to right leading with its first end 60. However, right to left release is also contemplated, and can be accomplished by appropriate configuration of an opposite leg 87 of the notch 64.

When the switch 58 slidably engages the formation 56, a gradual, upward opposing force 88 is applied to the formation 56. The formation 56 slides up the leg 65 and onto an upper generally horizontal edge of the switch 58, preferably at its mid portion 63.

In the alternative embodiment as seen in FIG. 2, the ring member 59 is upwardly rotated on the threads 67 on the housing 12 to engage the formation 56. As the ring member 59 moves vertically on the housing, it engages the formation 56 and vertically displaces it to release the blade 38.

In the clamp assembly 10a, as seen in FIG. 5, both the switch 58 and the ring member 59 are eliminated and the formation 56 is relatively larger. To release the saw blade 38, the upward opposing force 88 is applied directly to the formation 56 which is shaped like a finger pad or trigger. Preferably, the upward opposing force 88 is applied by an operator's finger.

When the upward opposing force 88 overcomes the downward biasing force 44 of the biasing element 42 exerted upon the piston 32, the piston is pushed upwardly within the cavity 14. As a result of the piston's upward movement, the locking elements 50 are also caused to rise upward above the now widening walls 76 and 78 of the bottom end 16 of the cavity 14. The wedging clamping force 84, seen best in FIG. 2, once exerted on the saw blade 38, is now relieved. The saw blade 38 is then released from the saw blade retention mechanism 30 and is allowed to pass freely through the passageway 28 and ultimately out the bore 22 or alternatively, the flared end 22a. A broken saw blade lodged in the blade clamp assembly 10 and 10a when the assembly is in an upright position, can be removed from the bore 22 or the flared end 22a in this same manner. If the assembly is inverted, broken blade fragments may be released out the bore 20 or alternatively, the flared end 20a.

After the retention mechanism 30 releases the saw blade 38, it is understood that the original or a replacement saw blade 38 can again be locked in position. In the assembly 10, as seen in FIG. 3, with the blade 38 inside the passageway 28, the switch 58 can be thrust transversely in a reverse direction, preferably from right to left. Once the switch 58 is thrust transversely in the reverse direction, the formation 56 slides down the leg 65 subject to the downward biasing force 44 of the biasing element 42. The downward biasing force 44 becomes greater than the upward opposing force 88, and the saw blade 38 is locked in position.

In the alternative embodiment, as seen in FIG. 2, the ring member 59 can be rotated in a reverse direction, away from the formation 56, becoming subject to the downward force 44 of the biasing element 42. The downward biasing force becomes greater than the upward opposing force 88 and the saw blade 38 is once again locked in position.

In the assembly 10a, depicted in FIG. 5, when an operator ceases to apply the upward opposing force 88, the inherent downward biasing force 44 of the biasing element 42 places the saw blade 38 in a locked position.

The present wedging blade clamp assembly for a scroll saw provides an improved quick release chuck device that allows the one-handed insertion of a saw blade into a holder without separate retraction of the blade holder or the use of a separate tool. A blade may be inserted into the present invention merely by thrusting a blade upward with sufficient force to overcome a biasing force exerted by a biasing element. Once inserted, the blade will not come out unless released, due to a wedging clamping force applied to the blade by at least one locking element. Embodiments are provided with and without a release member configured so that an operator can act on the saw blade retention mechanism to release the biasing force and allow removal of the blade. It is also contemplated that the present blade clamping mechanism can be used in other types of power tools as well.

While various embodiments of the present wedging blade clamp assembly for a scroll saw have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

We claim:

1. A wedging clamp assembly for retaining a saw blade, comprising:

a housing defining a vertical cavity therein, said cavity having a top end and a bottom end tapered with respect to said top end;

said bottom end of said vertical cavity having a saw blade passageway therein extending through a bottom end of said housing;

a saw blade retention mechanism disposed within said cavity, said saw blade retention mechanism including a piston and a biasing element disposed within said cavity, said mechanism is configured for lockingly retaining the saw blade upon insertion into said passageway, said mechanism producing a biasing force causing said piston to be biased against said bottom end of said cavity;

said saw blade retention mechanism further including at least one locking element disposed in said cavity for engaging said bottom tapered end and for exerting a wedging clamping force on the saw blade, said clamping force rendering the saw blade immobile relative to said housing;

said saw blade retention mechanism configured for releasing the blade when said biasing force on said piston is overcome by an opposing force applied to said piston, causing said wedging clamping force on the saw blade to be released; and said saw blade retention mechanism further including a formation projecting from said piston, said mechanism is further configured so that said locking elements are separated and said biasing force is overcome by mere insertion of the blade without manipulation of said formation.

2. The wedging clamp assembly of claim 1 wherein said wedging clamping force on the saw blade is released when said at least one locking element moves out of said bottom tapered end of said cavity, and wherein said at least one locking element is displaceable in said cavity upon insertion of the blade therein.

3. The wedging clamp assembly of claim 1 wherein said piston further comprises a top end and a bottom end, and wherein said bottom end of said piston has at least one slot.

4. The wedging clamp assembly of claim 3 wherein said saw blade retention mechanism further comprises said at least one locking element disposed in said at least one slot, and wherein said at least one locking element is laterally or horizontally movable within said at least one slot.

5. The wedging clamp assembly of claim 4 wherein said at least one locking element is configured for providing said wedging clamping force to retain the saw blade when said at least one locking element moves downwardly into said tapered bottom end of said cavity.

6. The wedging clamp assembly of claim 1 further including at least one face of said piston adjacent said top end of said piston, and a formation protruding from said face.

7. The wedging clamp assembly of claim 6 further comprising a release member configured for engaging said formation on said face of said piston.

8. The wedging clamp assembly of claim 7 wherein said release member is configured to be thrust transversely or rotated so as to engage said formation on said face and cause it to move upwardly.

9. The wedging clamp assembly of claim 8 wherein when said release member upwardly engages said formation an opposing force is applied to said formation, said opposing force overcomes said biasing force applied to said piston, permitting the saw blade to be removed from said passageway.

10. The wedging clamp assembly of claim 1 further including an insertion indicating stop member constructed and arranged for indicating the depth of insertion of the saw blade into said saw blade passageway.

11. The wedging clamp assembly of claim 1 further including a saw blade wiper constructed and arranged for preventing contamination from entering said saw blade passageway.

12. The wedging clamp assembly of claim 1 further including a boss portion disposed at said top end of said piston.

13. The wedging clamp assembly of claim 12 firer including said biasing element configured to be disposed around said boss portion.

14. The wedging clamp assembly of claim 1 wherein at least one of said ends of said vertical cavity further includes a passageway therein extending longitudinally through a top end and a bottom end of said housing, said passageway being configured for providing a space for passage of the saw blade.

15. The wedging clamp assembly of claim 14 further including at least one longitudinal bore in communication with said saw blade passageway.

16. The wedging clamp assembly of claim 15 wherein said at least one longitudinal bore is constructed and arranged for providing a space where broken blade fragments may be released from said assembly.

17. The wedging clamp assembly of claim 1 further including said biasing element disposed at said top end of said piston, said biasing element causing said piston to be biased against said bottom end of said cavity.

18. The wedging clamp assembly of claim 1 further including a cover plate for enclosing said saw blade retention mechanism, said cover plate having at least one extended portion for attaching said cover plate to said housing.

19. The wedging clamp assembly of claim 1 wherein said bottom tapered end of said cavity has a first and a second inner wall, each said wall having an angle of inclination.

20. The wedging clamp assembly of claim 19 wherein said angle of inclination of said first inner wall is equal to said angle of inclination of said second inner wall.

21. A wedging clamp assembly for retaining a saw blade, comprising:

a housing defining a vertical cavity therein, said cavity having a top end and a bottom end tapered with respect to said top end;

said bottom end of said vertical cavity having a saw blade passageway therein extending through a bottom end of said housing;

a saw blade retention mechanism disposed within said cavity, said saw blade retention mechanism including a piston and a biasing element disposed within said cavity, said mechanism is configured for lockingly retaining the saw blade upon insertion into said passageway, said mechanism producing a biasing force causing said piston to be biased against said bottom end of said cavity;

said saw blade retention mechanism further including at least one locking element disposed in said cavity for engaging said bottom tapered end and for exerting a wedging clamping force on the saw blade, said clamping force rendering the saw blade immobile relative to said housing;

said saw blade retention mechanism configured for releasing the blade when said biasing force on said piston is overcome by an opposing force applied to said piston, causing said wedging clamping force on the saw blade to be released;

wherein said bottom tapered end of said cavity has a first and a second inner wall, each said wall having an angle of inclination; and wherein said angle of inclination of said first inner wall varies from said angle of inclination of said second inner wall.

22. A wedging clamp assembly for retaining a saw blade, comprising:
- a housing defining a vertical cavity therein, said cavity having a top end and a bottom end tapered with respect to said top end;
- said bottom end of said vertical cavity having a saw blade passageway therein extending through a bottom end of said housing;
- a saw blade retention mechanism disposed within said cavity, said saw blade retention mechanism including a piston and a biasing element disposed within said cavity, said mechanism is configured for lockingly retaining the saw blade upon insertion into said passageway, said mechanism producing a biasing force causing said piston to be biased against said bottom end of said cavity;
- said saw blade retention mechanism further including at least one locking element disposed in said cavity for engaging said bottom tapered end and for exerting a wedging clamping force on the saw blade, said clamping force rendering the saw blade immobile relative to said housing;
- said saw blade retention mechanism configured for releasing the blade when said biasing force on said piston is overcome by an opposing force applied to said piston, causing said wedging clamping force on the saw blade to be released;
- wherein said bottom tapered end of said cavity has a first and a second inner wall, each said wall having an angle of inclination; and
- wherein one of said inner walls is generally vertical relative to said other inner wall.

23. A wedging clamp assembly for retaining a saw blade, comprising:
- a housing defining a vertical cavity therein, said cavity having a top end and a bottom end tapered with respect to said top end;
- said bottom end of said vertical cavity having a saw blade passageway therein extending through a bottom end of said housing;
- a piston having a top end and a bottom end and being disposed within said vertical cavity;
- said bottom end of said piston has at least one slot;
- at least one locking element disposed in said at least one slot, said locking element being radially or horizontally movable within said at least one slot, and being configured for providing a wedging clamping force to retain the saw blade when said at least one locking element moves downwardly into said tapered bottom end of said vertical cavity;
- a face of said piston adjacent said top end of said piston and a formation protruding from said face;
- a biasing element disposed in said cavity configured for providing a downward force to said piston to enable said wedging clamping force to be applied to the saw blade; and
- a release member configured for engaging said formation on said face of said piston, and wherein when said release member engages said formation said downward force of said biasing element is overcome permitting the saw blade to be removed from said passageway.

24. The wedging clamp assembly of claim 23 wherein said wedging clamping force on the saw blade is released when said at least one locking element moves out of said bottom tapered end of said cavity, and wherein said at least one locking element is displaceable in said cavity upon insertion of a blade therein.

25. A wedging clamp assembly for retaining a saw blade, comprising:
- a housing defining a vertical cavity therein, said cavity having a top end and a bottom end tapered with respect to said top end;
- said bottom end of said vertical cavity having a saw blade passageway therein extending through a bottom end of said housing;
- a piston having a top end and a bottom end and being disposed within said vertical cavity;
- said bottom end of said piston has at least one slot;
- at least one locking element disposed in said at least one slot, said locking element being radially or horizontally movable within said at least one slot, and being configured for providing a wedging clamping force to retain the saw blade when said at least one locking element moves downwardly into said tapered bottom end of said vertical cavity;
- at least one face of said piston adjacent said top end of said piston and a formation protruding from said face;
- a biasing element engaging said top end of said piston, said biasing element configured for providing a downward force to said piston to enable said wedging clamping force to be applied to the saw blade;
- said formation configured to effect reciprocal vertical movement of said piston; and
- wherein an upward force applied to said formation and overcoming said downward force of said biasing element permits the saw blade to be inserted or removed from said passageway.

26. The wedging clamp assembly of claim 25 further including a cover plate configured for enclosing said saw blade retention mechanism.

27. The wedging clamp assembly of claim 26 wherein said cover plate and said formation are integrally fabricated.

28. The wedging clamp assembly of claim 27 wherein said cover plate further comprises a track configured for providing slidable movement of said cover plate and said formation when the saw blade is inserted or released from said assembly.

29. The wedging clamp assembly of claim 25 wherein said wedging clamping force on the saw blade is released when said at least one locking element moves out of said bottom tapered end of said cavity, and wherein said at least one locking element is displaceable in said cavity upon insertion of a blade therein.

30. A wedging clamp assembly for retaining a saw blade, comprising:
- a housing defining a vertical cavity therein, said cavity having a top end and a bottom end tapered with respect to said top end;
- said bottom end of said vertical cavity having a saw blade passageway therein extending through a bottom end of said housing;
- a saw blade retention mechanism disposed within said cavity, said saw blade retention mechanism including a piston and a biasing element disposed within said cavity, said mechanism is configured for lockingly retaining the saw blade upon insertion into said saw blade passageway, said mechanism producing a biasing force causing said piston to be biased against said bottom end of said cavity;

said saw blade retention mechanism further including at least one locking element disposed in said cavity for engaging said bottom tapered end and for exerting a wedging clamping force on the saw blade, said clamping force rendering the saw blade immobile relative to said housing;

said saw blade retention mechanism configured for releasing the blade when said biasing force on said piston is overcome by an opposing force applied to said piston, causing said wedging clamping force on the saw blade to be released; and an insert member disposed in a counterbore of said piston, said insert member constructed and arranged for providing an insert passageway in communication with said saw blade passageway.

31. The wedging clamp assembly of claim 30 wherein the insert member includes at least one insertion-indicating stop member secured in the insert member to be pivotable with respect to said insert passageway.

* * * * *